(12) United States Patent
Hinrichs et al.

(10) Patent No.: US 7,464,219 B2
(45) Date of Patent: Dec. 9, 2008

(54) APPARATUS, SYSTEM, AND STORAGE MEDIUM FOR DATA PROTECTION BY A STORAGE DEVICE

(75) Inventors: Christopher John Hinrichs, San Jose, CA (US); Gavin Stuart Johnson, Aromas, CA (US); Harold Glen Slone, Los Gatos, CA (US); Luis Ricardo Urbanejo, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 11/194,203

(22) Filed: Aug. 1, 2005

(65) Prior Publication Data

US 2007/0028067 A1      Feb. 1, 2007

(51) Int. Cl.
    *G06F 21/00*      (2006.01)
(52) U.S. Cl. .................................... 711/112; 711/164
(58) Field of Classification Search ...................... None
    See application file for complete search history.

(56) References Cited

U.S. PATENT DOCUMENTS

| | | | | |
|---|---|---|---|---|
| 4,839,628 | A * | 6/1989 | Davis et al. ................ | 340/7.41 |
| 5,375,243 | A * | 12/1994 | Parzych et al. ............. | 726/17 |
| 5,721,872 | A | 2/1998 | Katsuta ...................... | 395/490 |
| 5,826,015 | A * | 10/1998 | Schmidt ..................... | 726/23 |
| 6,000,004 | A | 12/1999 | Fukumoto .................. | 711/103 |
| 6,012,146 | A | 1/2000 | Liebenow ................... | 713/202 |
| 6,145,053 | A * | 11/2000 | Smith ......................... | 711/112 |
| 6,243,796 | B1 * | 6/2001 | Otsuka ....................... | 711/163 |
| 6,286,087 | B1 * | 9/2001 | Ito et al. .................... | 711/164 |
| 6,289,423 | B1 | 9/2001 | Ozaki et al. ................ | 711/163 |
| 6,598,135 | B1 | 7/2003 | MacLeod ................... | 711/163 |
| 6,604,153 | B2 * | 8/2003 | Imamura et al. ............ | 710/36 |
| 6,728,844 | B2 * | 4/2004 | Sanada et al. .............. | 711/152 |
| 6,738,879 | B2 * | 5/2004 | Chan et al. ................. | 711/164 |
| 6,799,255 | B1 | 9/2004 | Blumenau et al. .......... | 711/152 |
| 6,975,966 | B2 * | 12/2005 | Scott et al. ................. | 702/183 |
| 7,010,647 | B1 * | 3/2006 | Karamchetty et al. ...... | 711/115 |
| 7,028,090 | B2 * | 4/2006 | McBrearty et al. ......... | 709/229 |

(Continued)

FOREIGN PATENT DOCUMENTS

EP          0919904          8/1998

(Continued)

OTHER PUBLICATIONS

International Search Report for PCT/EP2006/064796.

*Primary Examiner*—Kevin Verbrugge
(74) *Attorney, Agent, or Firm*—Kunzler & McKenzie (57) ABSTRACT

An apparatus, system, and storage medium are disclosed for utilizing data protection by a storage device to minimize loss of sensitive data on a storage medium. The apparatus includes a monitor module, a verification module, and a process module. The monitor module recognizes a write-type command from a host connected to an electronic data storage device. The verification module determines a presence of a passkey associated with the write-type command. The process module processes the write-type command according to the determination of the presence of the passkey. The apparatus, system, and storage medium provide protection of sensitive data at the device level so that a designated protected area on the electronic data storage device is protected against an inadvertent data overlay.

20 Claims, 6 Drawing Sheets

U.S. PATENT DOCUMENTS

| | | | |
|---|---|---|---|
| 7,136,951 B2 * | 11/2006 | Deng et al. | 710/302 |
| 7,140,045 B2 * | 11/2006 | Gudorf et al. | 726/28 |
| 7,213,119 B2 * | 5/2007 | Fujiwara et al. | 711/163 |
| 7,231,050 B1 * | 6/2007 | Harris | 380/286 |
| 7,237,109 B2 * | 6/2007 | Scott et al. | 713/164 |
| 7,318,137 B2 * | 1/2008 | Bress et al. | 711/163 |
| 2002/0078295 A1 * | 6/2002 | Shaath et al. | 711/112 |
| 2002/0133708 A1 * | 9/2002 | Gudorf et al. | 713/186 |
| 2003/0005278 A1 * | 1/2003 | Deng et al. | 713/2 |
| 2003/0046593 A1 * | 3/2003 | Xie et al. | 713/202 |
| 2004/0148130 A1 * | 7/2004 | Scott et al. | 702/183 |
| 2004/0148513 A1 * | 7/2004 | Scott et al. | 713/200 |
| 2004/0225803 A1 * | 11/2004 | Sheng | 710/303 |
| 2004/0243759 A1 * | 12/2004 | Itoh et al. | 711/112 |
| 2004/0260408 A1 * | 12/2004 | Scott et al. | 700/20 |
| 2005/0138433 A1 * | 6/2005 | Linetsky | 713/202 |
| 2005/0246778 A1 * | 11/2005 | Usov et al. | 726/28 |
| 2006/0080517 A1 * | 4/2006 | Brown | 711/163 |
| 2006/0090052 A1 * | 4/2006 | Leung | 711/163 |
| 2006/0259778 A1 * | 11/2006 | Gudorf et al. | 713/186 |
| 2006/0265756 A1 * | 11/2006 | Campbell et al. | 726/26 |
| 2006/0294298 A1 * | 12/2006 | Peterson et al. | 711/112 |
| 2007/0016702 A1 * | 1/2007 | Pione et al. | 710/62 |
| 2007/0028309 A1 * | 2/2007 | Gudorf et al. | 726/28 |
| 2007/0143096 A1 * | 6/2007 | Brunet et al. | 703/23 |
| 2007/0239608 A1 * | 10/2007 | Elbring | 705/51 |
| 2007/0250918 A1 * | 10/2007 | Aboual Chamat | 726/5 |

FOREIGN PATENT DOCUMENTS

| | | |
|---|---|---|
| EP | 1176492 | 6/2001 |
| JP | 2201670 A | 8/1990 |
| JP | 5081135 A | 4/1993 |

* cited by examiner

APPARATUS, SYSTEM, AND STORAGE MEDIUM FOR DATA PROTECTION BY A STORAGE DEVICE

BACKGROUND

1. Field of Art

This invention relates to protection of data on a storage device and more particularly relates to protecting data on a storage device without involving a host.

2. Background Technology

In a storage environment where blocks of data are stored on a storage device, there may be a selected area of data stored or a storage index which may need to be protected. Typically the storage environment consists of a host, such as an operating system, which stores data permanently on a non-volatile storage device, such as a hard drive. Communication between the host and the device is achieved by a storage controller, which decides how the storage device stores and accesses data on the storage medium. Today, in addition to managing data storage and access, storage controllers manage quality of service (QoS), virtualization, mirroring, replication, and many provide memory that acts as a buffer to enhance the read and write performance of the storage device.

In the continually evolving information age, one thing remains a constant: the need to protect mission-critical data. Whether it is for stock markets, corporate payroll, e-commerce, enterprise databases, medical records, internet banking, or reasons of national security, the need to protect data continues to grow with the need to store data.

One of the biggest hindrances to low total cost of ownership is the labor associated with managing storage-related issues. Managing storage resources and data automatically by system resources, rather than manually, helps lessen the problem. However, ensuring system-wide protection of the mission-critical data and storage indexes of the storage medium, such as the VTOC (volume table of contents) of the z/OS (z operating system), continues to present a unique management challenge. Mission-critical business systems typically span host and distributed computing environments, managing many of the critical business processes essential to the success of an organization. Sharing data from business processes with the other strategic systems and applications in the environment requires a comprehensive solution. Yet, the solution should be simple enough to be incorporated autonomously with minimal administrator oversight and without unduly burdening system performance.

The dominant server for such mission critical applications requiring management of large-scale databases continues to be mainframes. A mainframe is designed for high reliability, performance, broad-based connectivity options, and comprehensive enterprise storage solutions. Generally, operating systems that run on mainframes are highly reliable, support Web and Java-based applications, and host mission-critical applications. However, enterprise-class protection is not the only field lacking in data protection by a storage device. The protection of personal data is often considered no less valuable.

In the consumer electronics field, as products require an increasing amount of capacity to store digital content, the need to protect personal data increases as well. This is especially seen in products such as, but not limited to, personal computers, notebook computers, digital cameras, camcorders, digital video recorders (DVR), portable digital audio players, mobile telephones, personal digital assistants, and personal multimedia players.

Despite the numerous advancements in storage management, there is still room for improvement in the area of reliable protection of mission-critical data. The problem exists where sensitive data on a volume is inexplicably corrupted, causing loss of performance and, in worst case scenarios, loss of mission-critical data. In conventional systems, a host may provide its own protection of such storage areas, but current safety measures do not give adequate protection. For example, a storage device may consist of a hard drive that has protected tracks of data. An application may notify the host of its attempt to write to an area of unprotected tracks. However, in the event of an inadvertent data overlay, an unintentional alteration of stored data, the area of the storage medium that gets overlaid may be the storage index that keeps track of protected and unprotected areas. Suddenly, not only has the storage index become corrupted, but the write-type command to an unprotected area may now overwrite the protected tracks of data and, potentially, the entire protected area becomes vulnerable to inadvertent data overlays. This invention addresses the problem of inadvertent data overlays.

Conventional mechanisms are in place to protect these areas, such as serialization in the z/OS mainframe environment. However, this serialization is not enforced across multiple platforms and inadvertent data overlays are still possible. Other conventional technologies provide host-controlled protection that actually scans through all the commands from the host to the storage device and attempts to track, in software, whether a given write-type command is attempting to write to an area of the storage device that the write-type command has not been authorized to access. Unfortunately, such host-level solutions based in software have typically been shown to have a severe impact on system performance, resulting in the cost far outweighing the benefit of data protection by a storage device.

In addition, many of these inadvertent overlays go undiagnosed, thereby making it practically impossible to run a trace back to the source of the failure. As long as the protection methods remain at the host level, true protection of mission-critical and priceless personal data may be wanting.

From the foregoing discussion, it should be apparent that a need exists for an apparatus, system, and method that overcome the limitations of conventional host-level data protection by storage device methods. In particular, such an apparatus, system, and method would beneficially be independent of a particular host, thereby offering device-level protection. The apparatus, system, and method would also beneficially avoid untraceable data overlays that often go undiagnosed by determining who is attempting to update the storage data.

SUMMARY

The several embodiments of the present invention have been developed in response to the present state of the art, and in particular, in response to the problems and needs in the art that have not yet been fully solved by currently available data protection by a storage device methods. Accordingly, the present invention has been developed to provide an apparatus, system, and method to protect data on an electronic data storage device that overcomes many or all of the above-discussed shortcomings in the art.

The apparatus to protect data on an electronic data storage device is provided with a logic unit containing a plurality of modules configured to functionally execute the necessary operations for protecting data on an electronic data storage device. These modules in the described embodiments include a monitor module, a verification module, and a process module. Further embodiments include a notification module, an activation module, a definition module, a compare module, an index module, a write module, and a fail module.

The apparatus, in one embodiment, is designed to protect an allocated area of data on a storage medium, and disallow any write-type command to this protected area of the storage medium, unless a passkey (a specific bit or series of bits) is sent in association with a write-type command, that in effect unlocks the protected area. Therefore, a protection protocol may be implemented by the protection apparatus to specify how an area of a storage medium is to be allocated as a protected area, and the method of accessing the protected area of the storage medium.

In one embodiment, the monitor module may be configured to identify a request from a host computer to write data to a storage medium. In one embodiment, the monitor module is configured to recognize the difference between a write-type command, and all other requests to the storage device. In a further embodiment, the monitor module is configured to recognize the difference between write-type command to a protected area, and write-type command to an unprotected area on the storage medium. In another embodiment, the monitor module may be configured to recognize the difference between a write-type command from the host computer with a passkey, and a write-type command from the host computer that does not contain a passkey.

Additionally, the verification module may detect the inclusion of a correct passkey in association with a write-type command from a host computer, the passkey designed to obtain permission to access an area protected on the storage device. The verification module consists of a notification module, an activation module, a definition module, a compare module, and an index module. In one embodiment, the verification module may verify the write-type command of the host computer is executed according to the protocol and guidelines established by the protection apparatus. In a further embodiment, the verification module, in conjunction with the storage controller, may be configured to notify a system administrator that a predefined number of illegal attempts to write to a protected area of the storage medium have been processed, whereby a potential cause of recurring inadvertent overlays may be circumvented. The number of illegal attempts may be defined by the system administrator, or a default number set by the protection apparatus.

The process module may be configured to process a write-type command from the host-computer according to the outcome of the passkey verification processed by the protection apparatus, via the verification module, and more specifically, the compare module. In one embodiment, when the verification module determines a write-type command from the host computer follows the protection protocol established by the protection apparatus, the process module processes the write-type command. The process module may consist of a write module and a fail module.

In one embodiment, the write module may be configured to write data from the host computer to a protected area of the storage medium in response to the write-type command and a successful comparison of the passkey to the base key. In a further embodiment, the write module may be configured to process a write-type command from the host computer to an unprotected area of the storage medium in response to the write-type command and a determination that the data is not intended for the protected area.

The fail module may be configured to fail the write-type command from the host computer to storage device. In one embodiment, the fail module may fail a write-type command to the protected area of the storage medium if the host computer fails to supply a correct passkey. In a further embodiment, the fail module may fail a write-type command to the unprotected area if the host computer supplies a passkey because passkeys are intended for use only in association with the protected area.

The communication module may be configured to facilitate communications between the storage device and the host computer. In one embodiment, the communication module may be configured to acknowledge a write-type command to a protected area by a host computer was successfully processed via the process module. In a further embodiment, the communication module may be configured to communicate the status of a protected area of the storage medium. For example, the communication module may communicate whether the data protection capability is activated, as well as the size and available space of a protected area.

In conjunction with the protection apparatus, the trace module may be configured to determine who is attempting to update the storage device. In one embodiment, the trace module may consist of storing a trace table populated with an identification of the system making a write-type command to the storage device, and a time-stamp of the access. The I/O traceability function of the trace module is designed to resolve undiagnosed data corruption upon the storage device in the event of an attempted inadvertent data overlay on the storage medium. In one embodiment, the trace table may be stored in the memory device in conjunction with the storage device. In another embodiment, the trace table may be stored directly on the storage medium of the storage device.

The notification module, in one embodiment, may be implemented to notify the host computer of the capabilities of the protection apparatus to protect an area of the storage medium with a base key. When the host computer grants permission to the storage device to activate the protection apparatus, the communication module may communicate the approval to the storage device.

In one embodiment, the activation module initializes each of the components that make up the protection apparatus. Once activated, the activation module may be implemented to ensure the protection apparatus continues as intended. For example, having retained all current protection apparatus settings in a memory device in conjunction with the storage device, the activation module may be implemented to recover and restore all settings in the occurrence of an unexpected event such as a forced system reset, or unexpected loss of power.

Once the host computer authorizes the protection apparatus to activate the data protection capabilities, the value of the base key, as defined by the definition module, may be communicated to the host computer. In certain embodiments, the definition module may define either a random base key or a static base key. In a further embodiment, the definition module may allow a system administrator to define the base key. In another embodiment, the definition module may define the base key in relation to a hardware serial number of the storage device or similar hardware identification number.

The compare module, in conjunction with the verification module, compares the passkey to the base key, the compare module being made to verify that the single bit or series of bits of the passkey do indeed match the value of the defined base key. In response to the compare module computing a match between the passkey and the base key, the protection apparatus may then grant to the host computer access to the protected area of the storage medium for a write-type command to be processed.

The index module may be configured to index the protected area on the storage medium. The index module may store the location, size, and available space of the protected area in an index. In certain embodiments, the index module stores the index on the memory device, the buffer of the storage controller, or the storage medium.

A system of the present invention is also presented to protect data on an electronic data storage device. The system may be embodied as a storage device, the storage device configured to communicate with a host with the intention of accessing and storing data.

In particular, the system, in one embodiment, includes a storage medium configured to store electronic data. The system also includes a storage controller configured to specify how the storage device stores and accesses data on the storage medium, and a protection apparatus to protect a designated area of the storage medium, configured as described above. In a further embodiment, the system may include a memory device configured to store an index of a protected area on the storage medium, a communication module configured to acknowledge a request from a host to the electronic data storage device to protect an area of the storage medium using a base key, and a trace module configured to track access to the electronic data storage device.

A system of the present invention is also presented to store data on a protected area of an electronic data storage device. The system may be embodied as a host computer accessing a storage device with the intention of accessing and storing data on the storage medium.

In particular, the system, in one embodiment, includes a recognition module configured to detect the presence of an electronic data storage device connected to the host. The system also includes an acknowledge module configured to acknowledge the abilities of the electronic data storage device to protect an area of the electronic data storage device using a base key. In a further embodiment, the system may include an authorization module configured to authorize a storage controller to enable the protection ability of the electronic data storage device to protect with the base key an area of the electronic data storage device designated by the host, an allocation module configured to designate an area of the electronic data storage device as protected, and an implementation module configured to implement the protection ability of the electronic device to send a write-type command to a protected area of the electronic data storage device with a passkey.

A signal bearing medium is also presented to store a program that, when executed, performs operations to protect data on an electronic data storage device. In one embodiment, the operations include recognizing a write-type command from a host connected to an electronic data storage device, determining a presence of a passkey associated with the write-type command, and processing the write-type command according to the determination of the presence of the pass key.

In another embodiment, the operations may include defining a base key, the base key associated with a protected area on the electronic data storage device, comparing the passkey to a base key in order to gain access to a protected area on a storage medium, and writing data from a host computer to the protected area of the electronic data storage device in response to a compatibility between the passkey and the base key.

A signal bearing medium is also presented to store a program that, when executed, performs operations to protect data on an electronic data storage device. In one embodiment, the operations include detecting a presence of the electronic data storage device, hosting the electronic data storage device, and acknowledging a protection ability of the electronic data storage device to protect an area of the electronic data storage device using a base key.

In another embodiment, the operations may include authorizing a protection apparatus to enable the data protection capability of the electronic data storage device to protect an area of the electronic data storage device designated by the host, designating an area of the electronic data storage device as protected, and sending a write-type command and an associated passkey to the electronic data storage device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
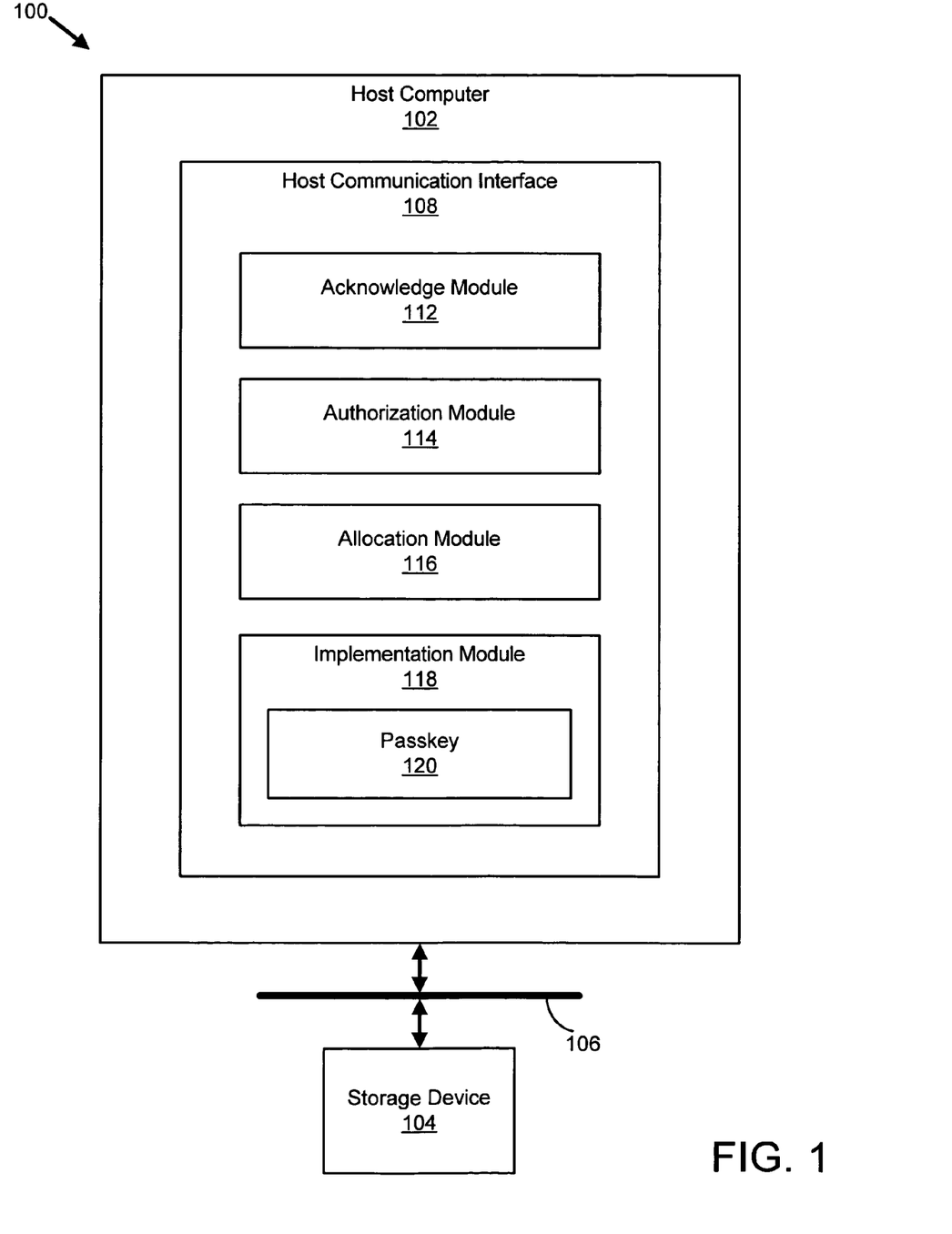
FIG. 1 is a schematic block diagram illustrating one embodiment of a storage system.

FIG. 1 depicts a schematic block diagram of one embodiment of a storage system 100. The illustrated storage system 100 includes at least one host computer 102. Each host computer 102 may be a mainframe computer. Alternatively, the host computer 102 may be a server, personal computer, notebook computer, digital camera, camcorder, digital video recorder/personal video recorder (DVR/PVR), portable digital audio player, mobile telephone, personal digital assistant, or personal multimedia player using one of a variety of operating systems. The host computer 102 is connected to the storage device 104 via a storage area network (SAN) or similar communication channel 106. A more in-depth description of the storage device 104 is included referring to FIG. 2.

The communication channel 106 may communicate over a storage area network (SAN). Alternatively, the host computer 102 may be connected directly to a storage device 104. In another embodiment, the host computer 102 may be connected directly to a flash memory device or similar non-volatile solid-state memory device.

The communication channel 106, in one embodiment, may be implemented using small computer system interface (SCSI), internet small computer system interface (iSCSI), serial advanced technology attachment (SATA), integrated drive electronics/advanced technology attachment (IDE/ATA), institute of electrical and electronic engineers standard 1394 (IEEE 1394), universal serial bus (USB), common internet file system (CIFS), network file. system (NFS/NetWFS), hypertext transport protocol (HTTP), file transfer protocol (FTP), transmission control protocol/internet protocol (TCP/IP), fiber connection (FICON), enterprise systems connection (ESCON), a solid-state memory bus, or any similar interface.

The host computer 102 also includes a host communication interface 108. In one embodiment, the host communication interface 108 includes a recognition module 110, an acknowledge module 112, an authorization module 114, an allocation module 116, and an implementation module 118. In another embodiment, the recognition module 110, acknowledge module 112, authorization module 114, allocation module 116, and implementation module 118 may be implemented directly within the host computer 102.

In operation, the recognition module 110 detects when a new storage device 104 is added to the storage system 100, for example, by a system user. Additionally, the recognition module 110 may detect when there is no storage device 104 attached to the storage system 100. The recognition module 110 may also detect when a storage device 104 is removed from the storage system 100. In another embodiment, the recognition module 110 may differentiate when a storage device 104 with data protection capabilities is added to the storage system 100 and when a storage device 104 without data protection capabilities is added to the storage system 100.

In one embodiment, the recognition module 110 may include a hardware mechanism, such as an electromechanical switch, to indicate when a storage device 104 with data protection capabilities is added to the storage system 100 or when a storage device 104 without data protection capabilities is added to the storage system 100. For example, the storage device 104 with data protection capabilities may contain a pin that actuates the electromechanical switch signaling to the host 102 that the device 104 has the data protection capabilities. In contrast, a storage device 104 without data protection capabilities may have this pin removed so as not to actuate the electromechanical switch.

When a storage device 104 is recognized to have data protection capabilities, the acknowledge module 112 may notify the storage device 104 that the data protection capabilities are recognized by the host computer 102 and that the host computer 102 is compliant with the protocol of the data protection by a storage device scheme. In one embodiment, the data protection capabilities may use a key to gain access to an area designated as protected, thereby the protected/locked area is unlocked and access granted for the intended write-type command operations. Write-type commands include, but are not limited to, erasure of previously written data, updates to previously written data, and writes to newly formatted areas or areas that have never before written to or that are newly protected. The references herein to write requests are exemplary of any write-type command and may refer to any of the write-type commands.

Once the host computer 102 acknowledges to the storage device 104 the capability of interacting with the data protection capabilities, the storage device 104 may receive permission from the host computer 102 to activate the data protection capabilities. In one embodiment, the authorization module 114 may send the authorization to the storage device 104 to activate the data protection capabilities.

If the storage device 104 is capable of data protection, the allocation module 116 may designate one or more areas on the storage device 104 as protected. In one embodiment, the allocation module 116 may allow a user to determine this designation. In another embodiment, the allocation module 116 may allow the storage device 104 to control the designation. In a further embodiment, the allocation module 116 may have the ability to alter the allocated size of the area protected and, conversely, the area unprotected, in real-time.

The allocation module 116 may designate either physical or logical areas on the storage device 104. A physical area may be a contiguous block of data storage space where, for example, there is a single contiguous area for protected data. A logical area may be a random set of individually accessed areas, for example, designated for protection of data. Thus, protected and unprotected data may be interspersed throughout the logical blocks of data on the storage device 104.

In one embodiment, the implementation module 118 implements a write instruction to an area of the storage device 104 designated as protected, the write instruction including an associated passkey 120. In one embodiment, the passkey 120 may be a bit or series of bits designed to temporarily allow access to an area of the storage device 104 designated as protected. The implementation module 118 may receive a command to write data to an area designated as protected and execute the write instruction with an associated passkey 120 according to the guidelines and protocols that may be established for operating the data protection capabilities of the storage device 104.

Figure 2:
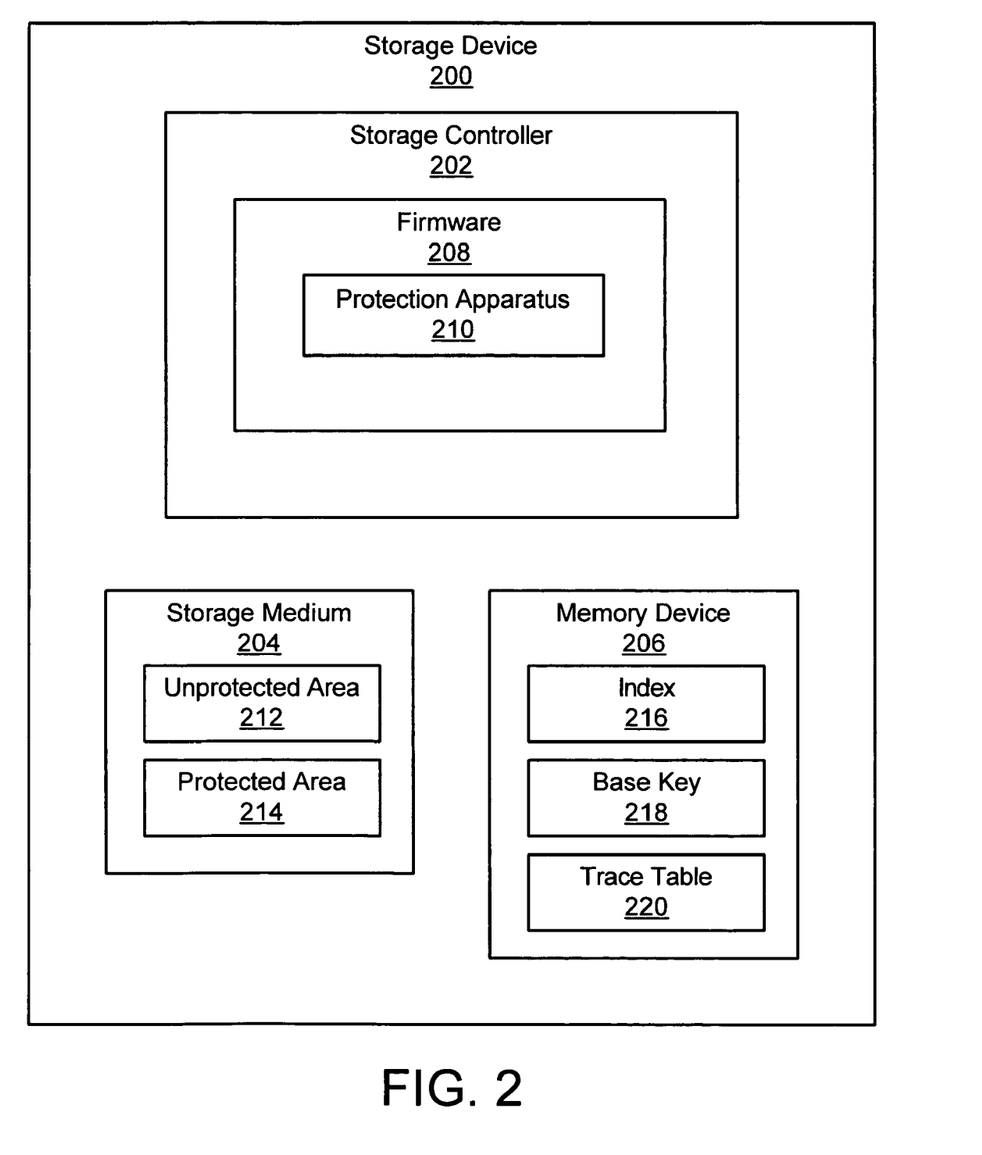
FIG. 2 is a schematic block diagram illustrating one embodiment of an electronic data storage device.

FIG. 2 depicts one embodiment of a storage device 200 that may be implemented in conjunction with the host computer 102 of FIG. 1. The storage device 200 is substantially similar to the storage device 104 of FIG. 1. The illustrated storage device 200 includes a storage controller 202, a storage medium 204, and a memory device 206. The storage device 200 may store and access data on the storage medium 204 according to the I/O operations of the storage controller 202. In certain embodiments, the storage device 200 may include a single storage medium 204 or a plurality of storage media 204.

The storage controller 202 may be configured to act as the communication interface between the host computer 102 and components of the storage device 200. The storage controller 202 communicates with the host computer 102 through the communication channel 106. When the host 102 sends a command to write or access data on a storage medium 204, the storage controller 202 may receive the command and determine how the data will be written or accessed on the storage medium 204. In one embodiment, the storage controller 202 is a small circuit board populated with integrated circuits and one or more memory devices 206. The storage controller 202 may be physically attached to the storage medium 204, such as a hard drive. In another embodiment, the storage controller 202 may be separate from the storage medium 204.

The storage controller 202 includes firmware 208 that may be stored on a non-volatile semiconductor or other memory device. Many of the operations of the storage controller 202 are determined by the execution of the firmware 208. The iillustrated firmware 208 includes a protection apparatus 210. In general, the protection apparatus 210 may implement a data protection by a storage device scheme on the storage medium 204. One example of the protection apparatus 210 is shown and described in more detail with reference to FIG. 3.

The illustrated storage medium 204 includes an unprotected area 212 and a protected area 214. The storage medium 204 may be a magnetic hard disk drive, solid state flash memory, magnetic tape drive, or another similar medium. The unprotected area 212 of the storage medium 204 is the location on the storage medium 204 to which the host computer 102 may send data that may not require protection from inadvertent data overwrites. In contrast, data stored in the protected area 214 is protected from inadvertent data overwrites. For example, mission-critical data, such as a storage medium 204 table of contents, may be written to the protected area 214 of the storage medium 204. As described above, the protected area 214 of the storage medium 204 may be designated as either physical or logical areas on the storage device 104.

The illustrated memory device 206 includes an index 216, a base key 218, and a trace table 220. The memory device 206 may act as a buffer (not shown) to increase the I/O performance of the storage device 200, as well as store microcode designed for operations of the storage device 200. The buffer, or cache, is used to hold the results of recent reads from the storage medium 204 and to pre-fetch data that has a high chance of being requested in the near future. The memory device 206 may consist of one or more non-volatile semiconductor devices, such as a flash memory, static random access memory (SRAM), non-volatile random access memory (NVRAM), electrically erasable programmable read-only memory (EEPROM), erasable programmable read only memory (EPROM), NAND/AND, NOR, divided bit-line NOR (DINOR), or any other similar memory device.

When the host computer 102 allocates a protected area 214 on the storage medium 204, the storage controller 202, via the protection apparatus 210, may store the location, size, and available space of the protected area 214 in the index 216. In one embodiment, the index 216 is stored on the same memory device 206 as the storage controller buffer. In another embodiment, the index 216 is stored on the actual storage medium 204 or on a separate memory device.

The protection apparatus 210 may use the base key 218 to secure a protected area 214 of the storage medium 204 from unauthorized write-type commands. In one embodiment, the base key 218 may be defined as a single bit or series of bits. In one embodiment, the passkey 120 from the host 102 must match the base key 218 in order to gain access to the protected area 214 of the storage medium 204. Alternatively, portions of the base key 218 and passkey 120 may be compared for a match. In one embodiment, the base key 218 may be stored on the memory device 206 or on the storage medium 204. In another embodiment, the base key 218 may be a software variable.

The base key 218 may be encoded as a binary value, an octal value, a hexadecimal value, an ASCII (American Standard Code for Information Interchange) value, or any other similar encoding. The base key 218 may be given a value as defined by the host computer 102. In one embodiment, the base key 218 may be configured as a random value as defined by a random process. In another embodiment, the base key 218 may be defined by a system administrator. In a further embodiment, the base key 218 may be defined by a hardware identification number, such as a hardware serial number of the storage device 104.

In one embodiment, the base key 218 may be implemented as a logical value in a bit or series of bits within a register in conjunction with the storage device 200. When the host computer 102 sends a write request to store data to a protected area 214 of the storage medium 204, the write request from the host computer 102 may include a command to latch the logical value of the base key 218 into the bit or series of bits within the register.

The trace table 220 may provide I/O traceability designed to resolve undiagnosed data corruption upon the storage device 200 in the event of an attempted inadvertent data overlay on the protected area 214 of the storage medium 204. The trace table 220 may store an identifier of a host 102 requesting a write-type command to the protected area 214 of the storage device 200, as well as a time-stamp of the request. The time-stamp may include the date or time the request was received, or both.

Figure 3:
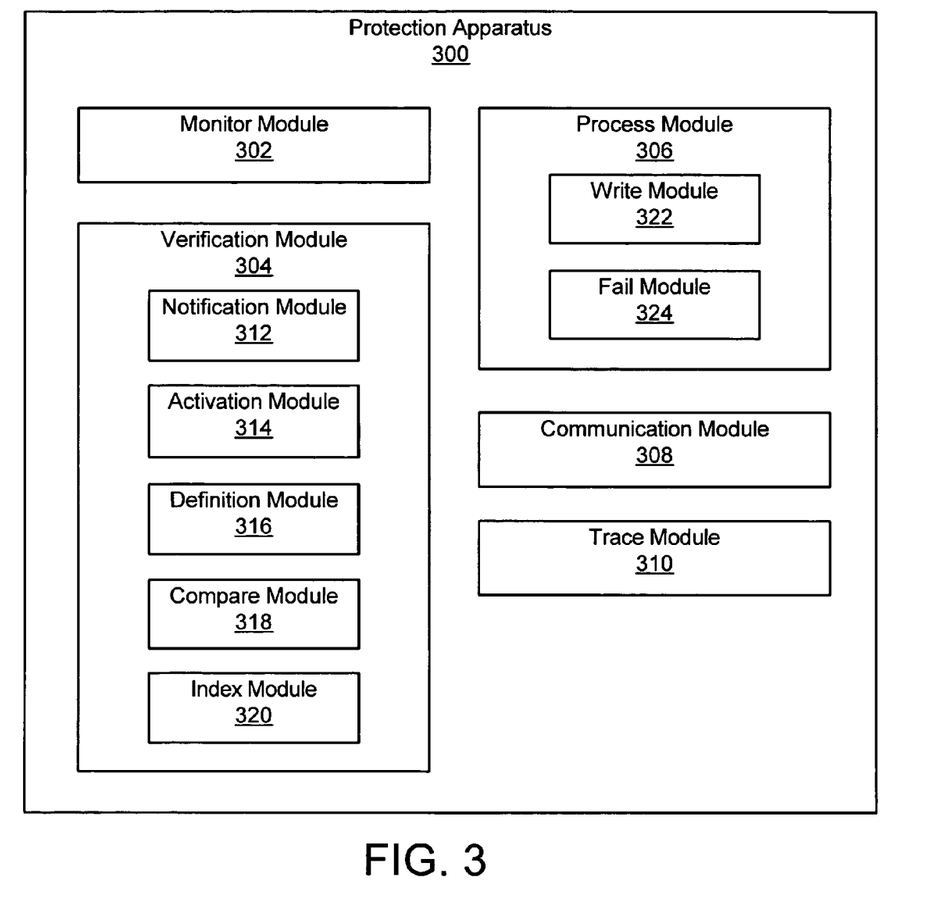
FIG. 3 is a schematic block diagram illustrating one embodiment of a protection apparatus.

FIG. 3 depicts a schematic block diagram of one embodiment of a protection apparatus 300 that may be implemented in conjunction with the storage device 200 of FIG. 2. The illustrated protection apparatus 300 may be activated once the host computer 102 notifies the storage device 200 that the data protection capabilities are recognized by the host computer 102, as described above in relation to FIG. 1.

In one embodiment, the protection apparatus 300 is implemented in microcode within the storage controller 202. In another embodiment, the protection apparatus 300 may be implemented in a program stored directly on the storage medium 204. The illustrated protection apparatus 300 includes a monitor module 302, a verification module 304, a process module 306, a communication module 308, and a trace module 310.

The protection apparatus 300 protects an allocated area of data on a storage medium 204 and prevents unauthorized write-type commands to the protected area 214 of the storage medium 204. To accomplish this, the protection apparatus 300 may implement a protection protocol to manage how a host 102 designates a protected area 214 and accesses or modifies data within the protected area 214.

In one embodiment, the protection apparatus 300 may define the base key 218 used to restrict access to the protected area 214. In order for a host computer 102 to gain access to the protected area 214, the protection protocol of the protection apparatus 300 may compare a passkey 120 from the host computer 102 against the base key 218.

Access to the protected area 214 of the storage medium 204 is granted to the host computer 102 when the protection apparatus 300 verifies, via the verification module 304, that the correct passkey 120 is supplied by the host 102. In one embodiment, once the write request has been processed and the data stored on the protected area 214, the bit or series of bits on the register representing the base key 218 may be reset, locking out access to the protected area 214 of the storage medium 204 until the next write request to a protected area 214 includes the correct passkey 120.

The monitor module 302 identifies a request from a host computer 102 to write data to the storage medium 204. In one embodiment, the monitor module 302 is configured to distinguish between a write request and any other request to the storage device 200. In a further embodiment, the monitor module 302 is configured to recognize the difference between write requests to the protected area 214 and write requests to the unprotected area 212. In another embodiment, the monitor module 302 may be configured to recognize the difference between a write request from the host computer 102 with a passkey 120 and a write request from the host computer 102 that does not contain a passkey 120.

The verification module 304 detects whether or not a passkey 120 is associated with a write request from a host computer 102. As described above, the passkey 120 is designed to obtain permission to access a protected area 214 on the storage device 200. In other words, a passkey 120 may unlock the protected area 214 of the storage medium 204 for write-type commands. In one embodiment, the verification module 304 may be configured to verify that a write request from the host computer 102 is executed according to the protection protocol.

In another embodiment, the verification module 304, in conjunction with the storage controller 202, may be configured to notify a system administrator that a predefined number of illegal attempts to write to a protected area 214 of the storage medium 204 have been received. In this way, a potential cause of recurring inadvertent overlays may be detected. In a further embodiment, upon receiving a command to write data to a protected area 214, the verification module 304 may verify a protected area 214 has been allocated and, if so, writes the protected data to the protected area 214. The verification module 304 includes a notification module 312, an activation module 314, a definition module 316, a compare module 318, and an index module 320.

The notification module 312, in one embodiment, may notify the host computer 102 of the capability of a storage device 200 to protect data stored on an area of the storage medium 204. In one embodiment, the activation module 314 initializes the protection apparatus 300 and ensures the continual operation of the protection apparatus 300. For example, having retained all current protection apparatus 300 settings in the memory device 206, the activation module 314 may be implemented to recover and restore operation of the protection protocol in response to an unexpected event, such as a forced reset of the storage system 100 or unexpected loss of power, affecting the storage device 200.

The definition module 316, in one embodiment, may define the base key 218. In certain embodiments, the definition module 316 may define either a randomly generated base key 218 or a static base key 218. In a further embodiment, the definition module 316 may allow a system administrator to define the base key 218. In another embodiment, the definition module 316 may define the base key 218 in relation to a hardware serial number of the storage device 200 or similar hardware identification number.

In one embodiment, the compare module 318, in conjunction with the verification module 304, compares the passkey 120 to the base key 218. In response to this comparison, the protection apparatus 300 may then grant to the host computer 102 access to the protected area 214 for a write-type command to be processed. The compare module 318 may receive the passkey 120 in conjunction with a write request from the host computer 102. In certain embodiments, the passkey 120 may be embedded within the data structure of the write request. Alternatively, the passkey 120 may be sent apart from the write request. In another embodiment, the compare module 318 may perform a Boolean operation to compare the base key 218 to the passkey 120 and determine whether there is a match.

The index module 320 may index the protected area 214 on the storage medium 204. For example, the index module 320 may store the location, size, and available space of the protected area 214 in the index 216, as described above. In certain embodiments, the index module 320 stores the index 216 on the memory device 206, the buffer of the storage controller 202, or the storage medium 204.

The process module 306 processes a write request according to the outcome of the passkey verification process. In one embodiment, the verification module 304 determines whether a write request meets the constraints of the protection protocol and, if so, the process module 306 processes the write request. The illustrated process module 306 consists of a write module 322 and a fail module 324.

In one embodiment, the write module 322 may be configured to write data from the host computer 102 to the protected area 214 in response to the write request and a successful comparison of the passkey 120 to the base key 218. In another embodiment, the write module 322 may be configured to process a write request from the host computer 102 to the unprotected area 212 in response to the write request and a determination that a passkey 120 was not included with the associated write request.

In contrast, the fail module 324 may fail a write request to the protected area 214 if the host computer 102 fails to supply a correct passkey 120. Similarly, the fail module 324 may fail a write request to the unprotected area 212 if the host computer 102 supplies a passkey 120 because passkeys 120 are intended for use only in association with the protected area 214.

The communication module 308 may manage communications between the storage device 200 and the host computer 102. In one embodiment, the communication module 308 conveys the regions of protected area 214 and unprotected area 212 on the storage medium 204 in response to a system query from the host computer 102. In another embodiment, the communication module 308 may be configured to acknowledge whether a write request to the protected area 214 is successfully processed or not.

In another embodiment, the communication module 308 may receive queries from the host computer 102 regarding the data protection capabilities of the storage device 200 and whether they are activated. In a further embodiment, the communication module 308 may relay to the host computer 102 the current status of the protected area 214 and unprotected area 212 of the storage medium 204, such as the current size of an area and the space available for storage.

In one embodiment, the trace module 310 may monitor the host computer 102. When the host computer 102 makes a request to perform a write-type command to the protected area 214 of the storage device 200, the trace module 310 may store a log that contains the identification of the host computer 102 and a time-stamp of the request on the trace table 220. In one embodiment, the trace module 310 may store a log of the write-type command request only when the verification module 304 determines the write-type command did not contain the correct passkey 120 associated with the write request.

Figure 4:
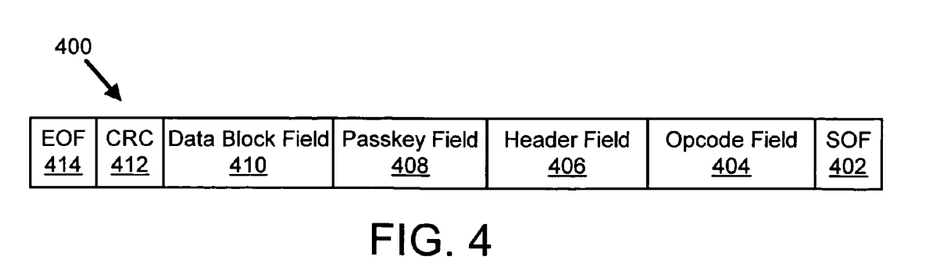
FIG. 4 is a schematic diagram illustrating one embodiment of a write request data structure.

FIG. 4 depicts one embodiment of a data structure 400 associated with a write-type command. The write request data structure 400 may include a framed type write request that envelopes the block of data to be written to the storage medium 204 alongside various fields, each field consisting of a bit or a series of bits. In one embodiment, the host computer 102 employs the data structure 400 in association with a request to store data on the storage medium 204.

The illustrated data structure 400 consists of many parts and may be fixed or variable in length. The data structure 400 includes a start delimiter SOF field 402 (start of frame), an opcode field 404, a header field 406, a passkey field 408, a data block field 410, a CRC field 412 (cyclic redundancy check), and an end delimiter EOF field 414 (end of frame).

The start delimiter SOF field 402 indicates to the storage device 200 the beginning of a new frame of a write-type command. The opcode field 404 contains the type of command the host computer 102 sends, which may include commands such as, but not exclusive to, a write, a read, an erase, a format, a verify, or a protect. The header field 406 may store the source of the command, such as identifying information of the host computer 102, and other control information. The passkey field 408 stores the value of the passkey 120 when a write request to a protected area 214 is sent by the host computer 102. The passkey field 408 may contain a null value, such as all zeroes, when a write request to an unprotected area 212 is sent by the host computer 102. The data block field 410 contains the block of data the host computer 102 requests to store on the storage medium 204. The CRC field 412 stores a calculated cyclic redundancy check that may be incorporated to verify the integrity of the data structure 400. The end delimiter EOF field 414 indicates to the storage device 200 the end of a frame.

When the host computer 102 frames a write request and sends it to the storage device 200, the protection apparatus 300 may be configured to strip the passkey 120 from the passkey field 408 and compare the passkey 120 to the base key 218. In another embodiment, the host computer 102 may send the passkey 120 separately from the write request with which it is associated.

Figure 5A:
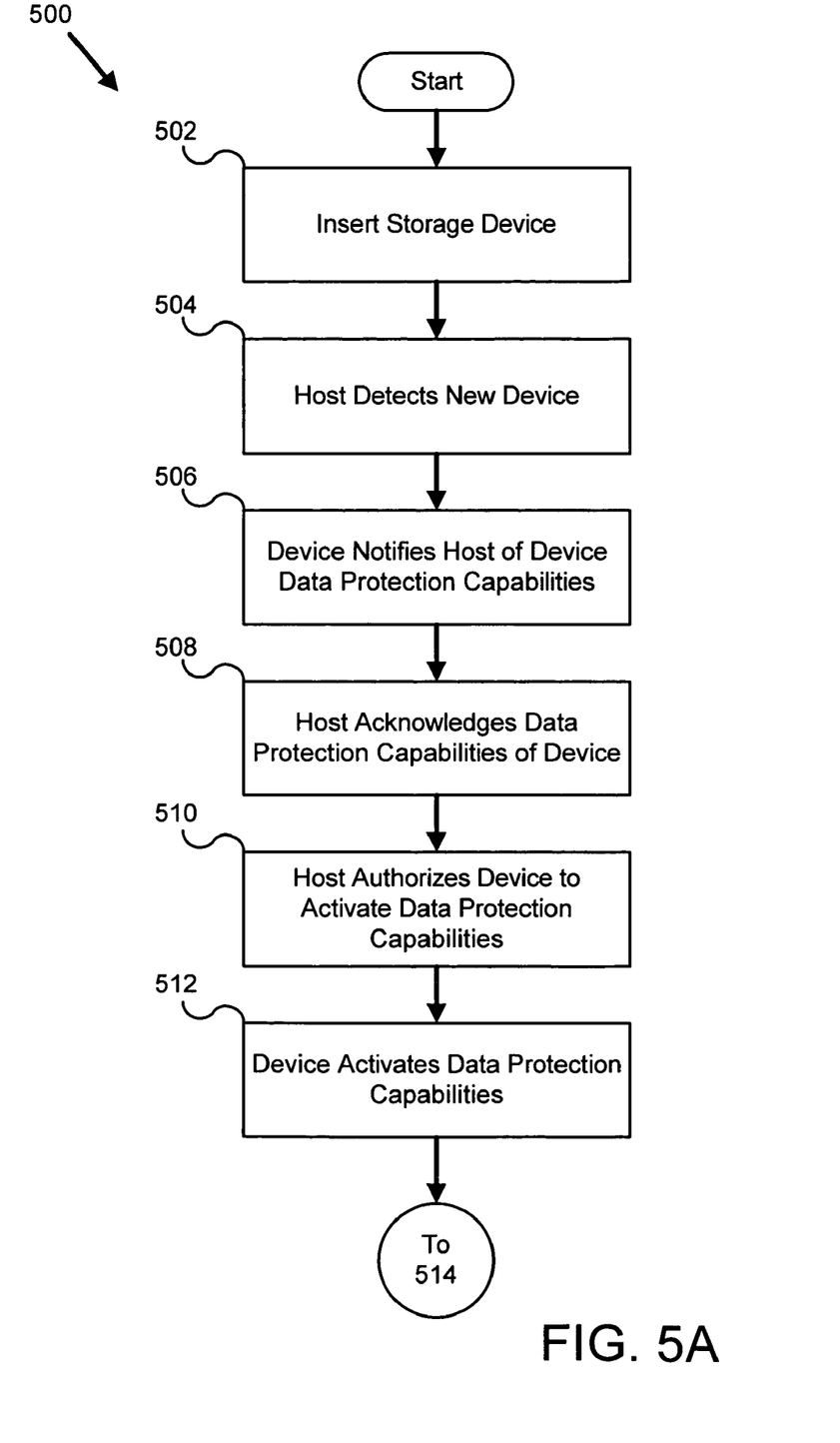
FIGS. 5A and 5B are schematic flow chart diagrams illustrating one embodiment of an initialization method.
Figure 5B:
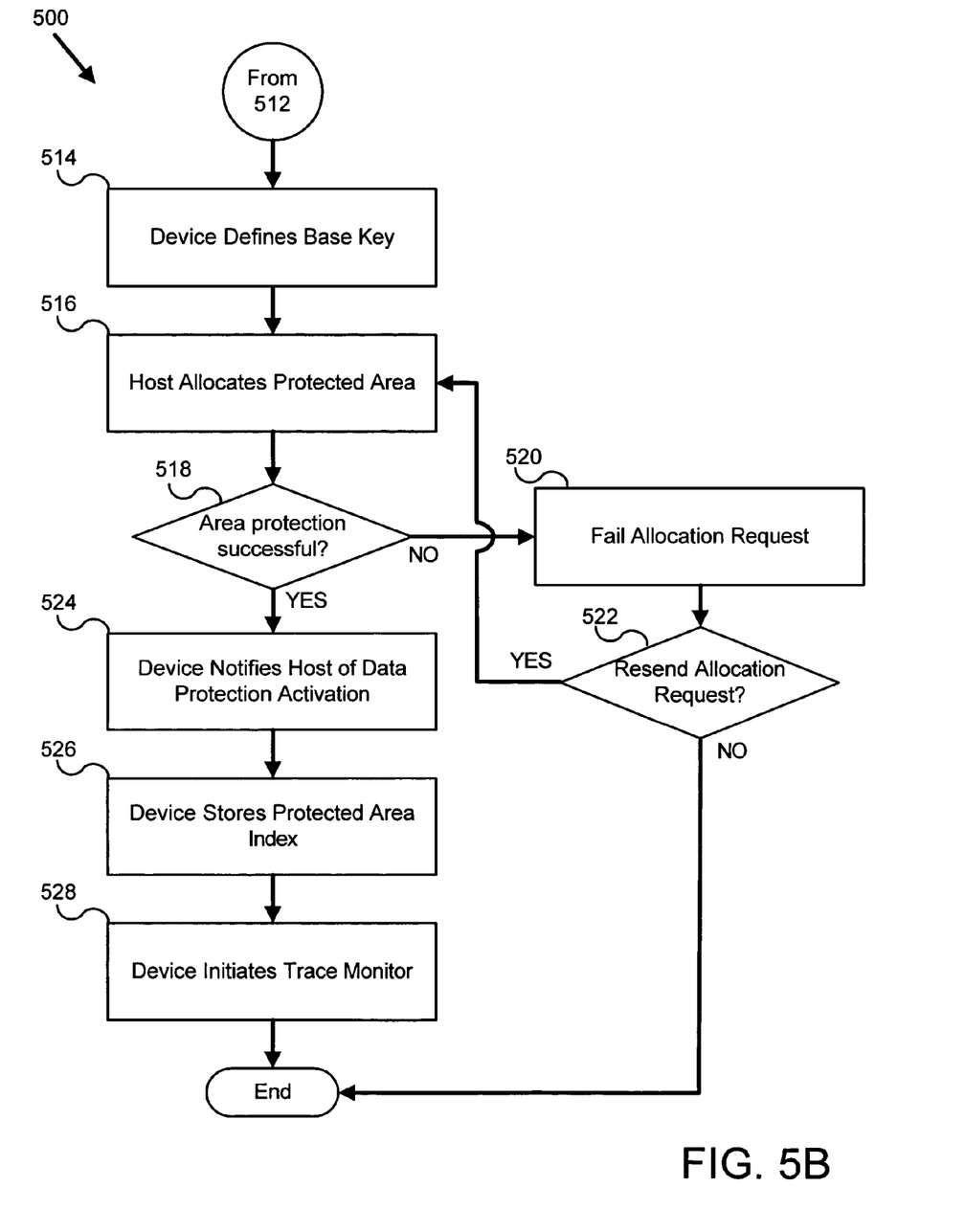

FIGS. 5A and 5B depict one embodiment of an initialization method 500 that may be implemented by the protection apparatus 300 of FIG. 3. For convenience, the initialization method 500 is shown in a first part 500A and a second part 500B, but is referred to collectively as the initialization method 500. The initialization method 500 is described herein with reference to the storage system 100 of FIGS. 1 and 2.

The initialization method 500 includes operations to insert 502 a storage device 200 into the storage system 100, detect 504 the inserted storage device 200, and notify the host computer 102 of, as well as acknowledge 508, authorize 510, and activate 512, the data protection capabilities. The initialization method 500 includes additional operations to define 514 a base key 218, allocate 516 a protected area 214, determine 518 the success of the allocation, fail 520 an unsuccessful allocation, determine 522 whether to resend an unsuccessful allocation, notify 524 the host computer 102 the data protection capabilities are functioning, store 526 an index 216 of a protected area 214, and initiate 528 a trace monitor.

The initialization method 500 initiates the protection abilities of the protection apparatus 300 associated with a storage device 200. Although the initialization method 500 is depicted in a certain sequential order, for purposes of clarity, the storage system 100 may perform the operations in parallel and/or not necessarily in the depicted order.

The illustrated initialization method 500 starts when a user or system administrator inserts 502 a storage device 200 into the storage system 100. In certain embodiments, the user may insert 502 a storage device 200 into a storage system 100 while it is powered off or insert 502 a hot-swappable storage device 200 into the storage system 100 that is already powered on.

After a system user inserts 502 a storage device 200 into the storage system 100, the host computer 102 detects 504 the attached storage device 200. The recognition module 110, in one embodiment, detects 504 when a system user inserts 502 a storage device 200 into the storage system 100.

In response to the host 102 detecting 504 the newly added storage device 200, the storage device 200 notifies 506 the host computer 102 of its ability to secure a protected area 214 of the storage medium 204 using a base key 218. The host computer 102 acknowledges 508 to the storage device 200 the data protection capabilities of the protection apparatus 300 contained in the storage device 200. In one embodiment, the acknowledge module 112 may acknowledge 508 that the host 102 is compliant with the protection protocol via the host communication interface 108.

After acknowledging 508 the data protection capabilities of the protection apparatus 300, the host computer 102 may authorize 510 the storage device 200 to initialize the data protection capabilities. The authorization module 114, in one embodiment, authorizes 510 the storage device 200 to initialize the data protection capabilities. The storage device 200 may receive the authorization from the host computer 102 through the communication channel 106.

Once the storage device 200 receives permission to initialize the data protection capabilities, the storage device 200 activates 512 the protection apparatus 300. In one embodiment, the activation module 314 may activate 512 the protection apparatus 300. If applicable, the activation module 314 may recover and restore operation of the protection apparatus 300 in response to a forced reset of the storage system 100, unexpected loss of power, or other detrimental event.

Having activated 512 the protection apparatus 300, the storage device 200 may receive a request from the host computer 102 to save data to a protected area 214 or to assign an area on the storage medium 204 as a protected area 214. However, before data is saved to a protected area 214, or a protected area 214 assigned, the storage device 200 defines 514 a base key 218. The base key 218 may be defined 514, in one embodiment, by the definition module 316. The definition module 316 may determine the aspects that define the base key 218, such as its length, value, encoding, and where it is stored.

After the value of the base key is defined 514, the host computer 102 is no longer restricted from designating an area of the storage medium 204 as a protected area 214 and may send a request to allocate 516 an area of the storage medium 204 as a protected area 214. The allocation module 116, in one embodiment, may allocate 516 one or more areas on the storage device 104 as protected. As described above, the allocation module 116 may allow a user or the storage device 200 to determine this designation, and may designate the allocation in either physical or logical areas on the storage device 104.

Once the request to allocate 516 a protected area 214 of the storage medium 204 is received, the initialization method 500 determines 518 whether the allocation is performed without any conflicts. For example, the storage device 200 may not have enough space for the size of the allocation requested, or the required area may be write protected, or there may be a large data transfer in progress causing the request to time out.

If the protection apparatus 300 is unable to successfully allocate an area of the storage medium 204 as a protected area 214, the initialization method 500 fails 520 the allocation request. The fail module 306 may initiate a fail sequence based upon the cause of the failure. Thus the storage device 200 may notify the host computer 102 that the request to allocate 516 a protected area 214 has failed 520. Once the allocation request fails 520, the initialization method 500 determines 522 whether the host computer 102 will resend the request to allocate 516 a protected area 214. In one embodiment, the system user may set the number of attempts an allocation request can be resent once it fails 520.

However, if the host computer 102 successfully allocates 518 an area of the storage medium 204 as a protected area 214, the storage device 200 notifies 524 the host computer 102 that the allocation request is successful, and that the data protection capabilities are activated.

Once the protected area 214 is allocated 516, the storage device 200 stores 526 an index 216 on a memory device 206. In one embodiment, the index 216 includes the location, size and available space of the protected area 214. In another embodiment, the index 216 is stored directly on the storage medium 204.

After the host computer 102 successfully allocates 518 a protected area 214 on the storage medium 204, the storage device 200 initiates 528 a trace monitor in order to provide I/O traceability. In one embodiment, the trace module 310 actively tracks each host computer 102 with write-type command access to the storage medium 204. Thus, a system user may resolve undiagnosed data corruption upon the storage device 200 in the event of an attempted inadvertent data overlay on the protected area 214 of the storage medium 204. As described above, the trace module 310 may store a log on a trace table 220 that may include the identification of each host computer 102 requesting a write-type command to a protected area 214, as well as a time-stamp of the request. Once the storage device 200 initiates 528 the trace monitor, the initialization method 500 may be concluded.

Figure 6:
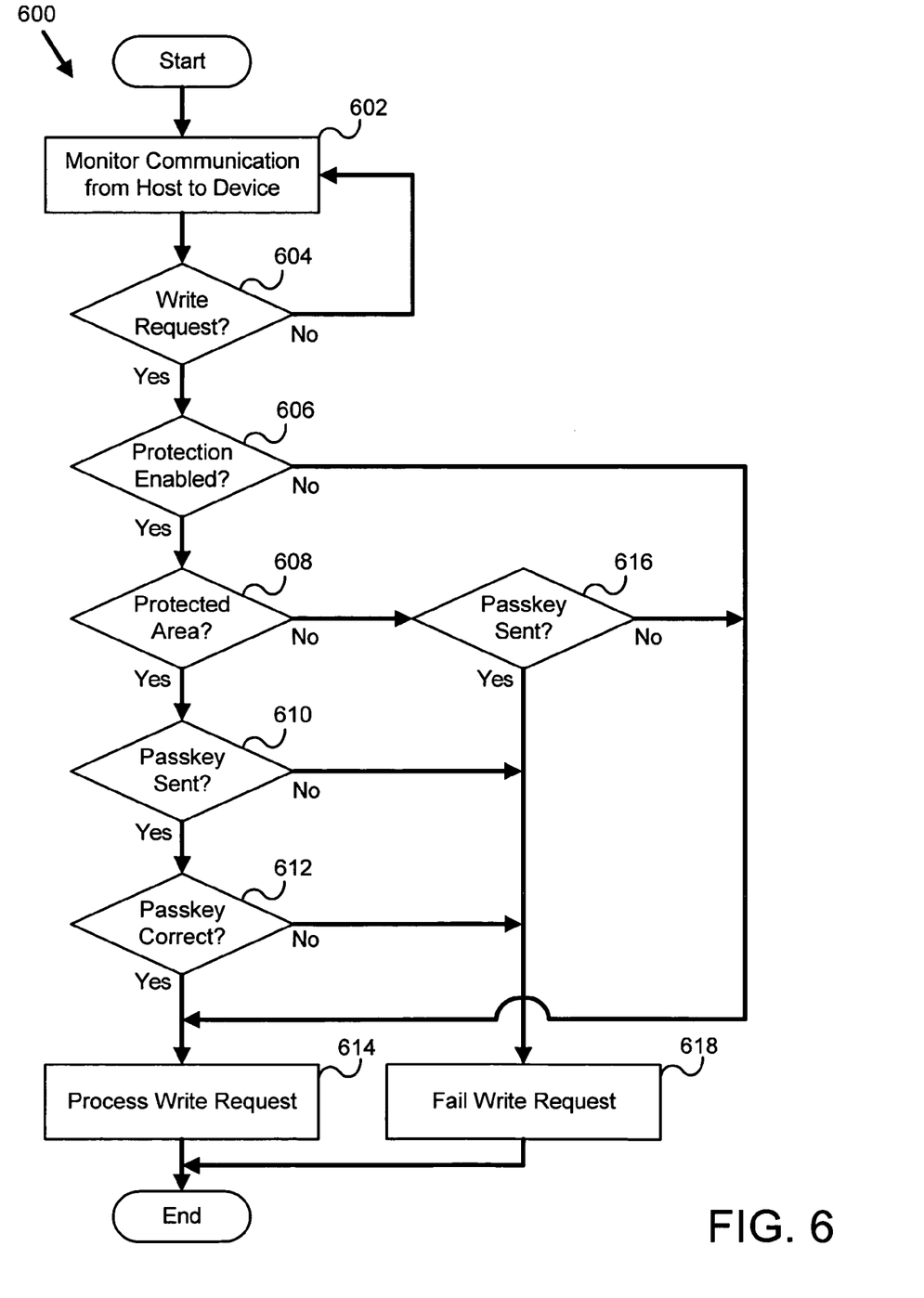
FIG. 6 is a schematic flow chart diagram illustrating one embodiment of a write method.

FIG. 6 depicts one embodiment of a write method 600. The write method 600 may be conducted using the storage system 100 of FIGS. 1 and 2. The write method 600 includes operations to monitor 602 communication between the host computer 102 and the storage device 200, determine 604 whether a command from the host computer 102 is a write request, and determine 606 whether the data protection capabilities are enabled. The illustrated write method 600 also includes additional operations to determine 608 whether the command requests data be stored to a protected area 214, determine 610 whether a passkey 120 is included in a write request to a protected area 214, determine 612 whether the passkey 120 is correct, process 614 a write request, determine 616 whether a passkey 120 is included in a write request to an unprotected area 212, and fail 618 a deficient write request.

The write method 600 processes a write request from the host computer 102 to a storage device 200 that is actively protecting a protected area 214 of the storage medium 204 from inadvertent data overlays. Although for purposes of clarity, the operations of write method 600 are depicted in a certain sequential order, execution within an actual system may be conducted in parallel and not necessarily in the depicted order.

The write method 600 starts and the protection apparatus 300 monitors 602 communications between the host computer 102 and the storage device 200. The monitor module 302, in one embodiment, monitors 602 the communications between the host computer 102 and storage device 200. For example, the monitor module 302 may monitor 602 the types of commands sent by the host computer 102 to the storage device 200 by stripping the type of command from the opcode field 404 of the data structure 400.

When the monitor module 302 receives a command from the host computer 102, the monitor module 302 examines the commands in order to determine 604 whether a command sent to the storage device 200 is a write request (i.e. write-type command). If the write method 600 determines 604 the command is a write request, the write method 600 proceeds to determine 606 if the data protection capabilities are enabled for the storage device 200. If the command is not a write request, the write method 600 returns to monitor 602 the communication between the host computer 102 and the storage device 200.

Having received a write request, the write method 600 determines 606 whether the protection capabilities for the storage device 200 are activated. If the write method 600 determines 606 that the protection apparatus 300 is active, the write method 600 proceeds to determine 608 whether the destination of the write-type command is to a protected area 214. If the write method 600 determines 606 the protection apparatus 300 is not active, the write method 600 proceeds to process 614 the write request. With the data protection capabilities of the protection apparatus 300 enabled, the write method 600 determines 608 whether the destination where the host computer 102 requests to write data is a protected area 214 of the storage medium 204.

Having received a request from the host computer 102 to store data to a protected area 214 of the storage medium 204, the write method 600 may determine 610 whether the write request includes a passkey 120. If the write method 600 determines 610 that the write request includes a passkey 120, the write method 600 proceeds to determine 612 whether the included passkey 120 is correct. If the write method 600 determines 610 that the write request to a protected area 214 does not include a passkey 120, the write method 600 proceeds to fail 618 the write request. If a passkey 120 is included and is correct, the write method 600 processes 614 the write request.

However, if the write method 600 determines 608 the host computer 102 sends a write request to an unprotected area 212 of the storage medium 204, the write method 600 may determine 616 whether the write request to an unprotected area 212 includes a passkey 120. If the write method 600 determines 616 the write request includes a passkey 120, the write method 600 proceeds to fail 618 the write request. If the write request to an unprotected area 212 does not include a passkey 120, the write method 600 proceeds to the process 614 the write request.

The protection of data imparted by embodiments of the present invention can have a real and positive impact on overall system performance. In certain embodiments, the present invention improves uptime, application availability, and real time business performance, all of which results in driving lower the total cost of ownership. In addition to protecting data, embodiments of the present invention afford the system administrator the ability to trace write-type commands to a storage device 200, and track the possible source of any attempted inadvertent data overlay.

The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to protect data on an electronic data storage device, the apparatus comprising:
    a monitor module comprising executable code stored on a semiconductor device, executed by a processor, and configured to recognize a write-type command from a host connected to an electronic data storage device of a plurality of electronic data storage devices, wherein the electronic data storage device is hot-swappable;
    a verification module coupled to the monitor module, the verification module comprising executable code stored on the semiconductor device, executed by the processor, and configured to determine a presence of a passkey associated with the write-type command; and
    a process module coupled to the verification module, the process module comprising executable code stored on the semiconductor device, executed by the processor, and configured to process the write-type command according to the determination of the presence of the passkey.

2. The apparatus of claim 1, further comprising a notification module coupled to the verification module, the notification module comprising executable code stored on the semiconductor device, executed by the processor, and configured to notify the host of a protection ability of the electronic data storage device to protect an area of the electronic data storage device using a base key upon insertion of the electronic data storage device.

3. The apparatus of claim 1, further comprising an activation module coupled to the verification module, the activation module comprising executable code stored on the semiconductor device, executed by the processor, and configured to protect with a base key an area of the electronic data storage device designated by the host.

4. The apparatus of claim 1, further comprising a definition module coupled to the verification module, the definition module comprising executable code stored on the semiconductor device, executed by the processor, and configured to define a base key, the base key associated with a protected area on the electronic data storage device.

5. The apparatus of claim 4, further comprising a compare module coupled to the verification module, the compare module comprising executable code stored on the semiconductor device, executed by the processor, and configured to compare the passkey to the base key.

6. The apparatus of claim 5, further comprising a write module coupled to the process module, the write module comprising executable code stored on the semiconductor device, executed by the processor, and configured to write data from the host to the protected area of the electronic data storage device in response to the write-type command and a compatibility between the passkey and the base key.

7. The apparatus of claim 1, further comprising a write module coupled to the process module, the write module comprising executable code stored on the semiconductor device, executed by the processor, and configured to write data from the host to an unprotected area of the electronic data storage device in response to the write-type command and an absence of the passkey.

8. The apparatus of claim 1, further comprising a fail module coupled to the process module, the fail module comprising executable code stored on the semiconductor device, executed by the processor, and configured to fail the write-type command from the host to a protected area of the electronic data storage device in response to a failure by the host to supply a correct passkey.

9. The apparatus of claim 1, further comprising a fail module coupled to the process module, the fail module comprising executable code stored on the semiconductor device, executed by the processor, and configured to fail the write-type command from the host to an unprotected area of the electronic data storage device in response to the presence of the passkey.

10. The apparatus of claim 1, further comprising an index module coupled to the verification module, the index module comprising executable code stored on the semiconductor device, executed by the processor, and configured to store an index associated with a protected area on the electronic data storage device.

11. A system to protect data on an electronic data storage device, the system comprising:
   a host;
   an electronic data storage device of a plurality of electronic data storage devices coupled to the host, wherein the electronic data storage device is hot-swappable;
   a storage medium coupled to the electronic data storage device, the storage medium configured to store data;
   a storage controller coupled to the storage device, the storage controller configured to manage storage of, and access to, the data on the storage medium;
   a recognition module, coupled to the host, the recognition module comprising executable code stored on a semiconductor device, executed by a processor, and configured to recognize the electronic data storage device; and
   an acknowledge module comprising executable code stored on the semiconductor device, executed by the processor, and configured to acknowledge a protection ability of the electronic data storage device to protect an area of the storage medium using a base key.

12. The system of claim 11, wherein the electronic data storage device comprises a communication module, coupled to the storage controller, the communication module comprising executable code stored on the semiconductor device, executed by the processor, and configured to facilitate data communication between the electronic data storage device and the host.

13. The system of claim 11, wherein the electronic data storage device comprises a trace module, coupled to the storage controller, the trace module comprising executable code stored on the semiconductor device, executed by the processor, and configured to track access to the electronic data storage device by the host.

14. A system to protect data on an electronic data storage device, the system comprising:
   a host coupled to an electronic data storage device of a plurality of electronic data storage devices, the electronic data storage device coupled to a protection apparatus, wherein the electronic data storage device is hot-swappable;
   a recognition module, coupled to the host, the recognition module comprising executable code stored on a semiconductor device, executed by a processor, and configured to recognize the electronic data storage device; and
   an acknowledge module comprising executable code stored on the semiconductor device, executed by the processor, and configured to acknowledge a protection ability of the electronic data storage device to protect an area of the electronic data storage device using a base key.

15. The system of claim 14, further comprising an allocation module, coupled to the host, the allocation module comprising executable code stored on the semiconductor device, executed by the processor, and configured to designate the protected area of the electronic data storage device.

16. The system of claim 14, further comprising an implementation module, coupled to the host, the implementation module comprising executable code stored on the semiconductor device, executed by the processor, and configured to send a write-type command and an associated passkey to the electronic data storage device.

17. A storage medium tangibly embodying a program of machine-readable instructions executable by a digital processing apparatus to perform operations to protect data on an electronic data storage device, the operations comprising:
   recognizing a write-type command from a host connected to an electronic data storage device of a plurality of electronic data storage devices, wherein the electronic data storage device is hot-swappable;
   determining a presence of a passkey associated with the write-type command; and
   processing the write-type command according to the determination of the presence of the pass key.

18. The storage medium of claim 17, wherein the instructions further comprise an operation to define a base key, the base key associated with a protected area on the electronic data storage device.

19. The storage medium of claim 18, wherein the instructions further comprise an operation to compare the passkey to the base key.

20. The storage medium of claim 19, wherein the instructions further comprise an operation to write data from the host to the protected area of the electronic data storage device in response to a compatibility between the passkey and the base key.

* * * * *